Patented Oct. 14, 1941

2,259,403

UNITED STATES PATENT OFFICE 2,259,403

PROCESS FOR THE PRODUCTION OF BERYLLIUM CHLORIDE

Helmut von Zeppelin, Bitterfeld, Germany, assignor, by mesne assignments, to Walther H. Duisberg, New York, N. Y.

No Drawing. Application April 3, 1939, Serial No. 265,757. In Germany April 5, 1938

1 Claim. (Cl. 23—21)

This invention relates to a process for the production of beryllium chloride from certain mixtures obtained in working up beryllium ores or other beryllium containing materials.

Minerals containing beryllium are usually decomposed by treatment with fluorine compounds, such as hydrofluoric acid or ammonium fluoride, yielding solutions containing the beryllium in the form of a fluoride. Since the production of metallic beryllium from such fluoride compounds is attended with difficulties, it is frequently preferable to produce the metal from chloride of beryllium.

In my co-pending applications S. N. 265,509 and S. N. 265,510 both entitled Process for the production of beryllium compounds and filed on April 1, 1939, I have described and claimed two methods of recovering beryllium compounds from solutions containing beryllium in the form of beryllium fluoride and beryllium double fluorides, such methods essentially comprising the treatment of such solutions in such a manner as to precipitate therefrom a mixture of beryllium hydroxide and an alkaline earth metal fluoride, e. g. calcium fluoride. In accordance with my copending applications, such mixtures are worked up into substantially pure beryllium compounds by a subsequent treatment with certain chemical reagents adapted to dissolve the beryllium compounds while leaving the calcium fluoride contained in the precipitated mixture behind.

The main object of the present invention is to convert the beryllium compounds contained in such precipitated mixtures into beryllium chloride and separating such beryllium chloride from the calcium fluoride or any other alkaline earth metal fluorides contained in the mixture.

To this end, such mixtures which contain the beryllium in the form of its hydroxide are in accordance with the invention first calcined for a short period at a temperature of 500 and 700° C. so as to convert the beryllium hydroxide into the oxide, and then treated with chlorine in the presence of carbon at elevated temperatures in a manner known per se for the production of beryllium chloride from beryllium oxide, such treatment resulting in the volatilization of the whole beryllium content of the mixture of precipitates in the form of beryllium chloride. The volatilized beryllium chloride can then be recovered in a practically pure form by condensation.

I claim:

A process for producing and recovering beryllium chloride from mixtures of precipitates containing beryllium hydroxide and an alkaline earth metal fluoride which comprises calcining such mixture so as to convert the beryllium hydroxide into beryllium oxide, thereupon treating the resulting mixed product with chlorine in the presence of carbon so as to convert the beryllium oxide into volatile beryllium chloride while leaving the calcium fluoride as a residue, and condensing such volatilized beryllium chloride.

HELMUT VON ZEPPELIN.